June 16, 1925.                              1,542,214
L. A. CADORET
SHUTTLE THREADING DEVICE
Filed Oct. 30, 1924           3 Sheets-Sheet 1
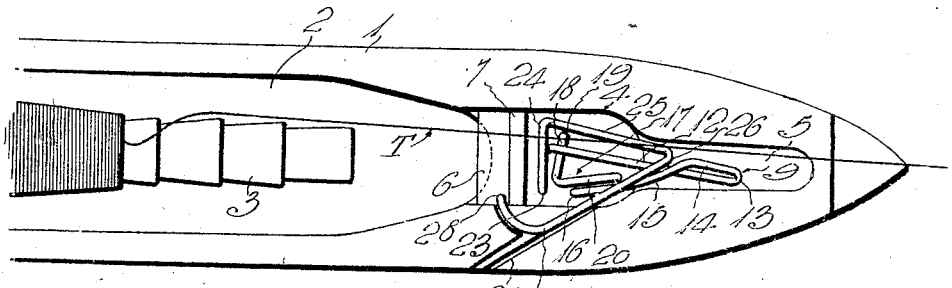
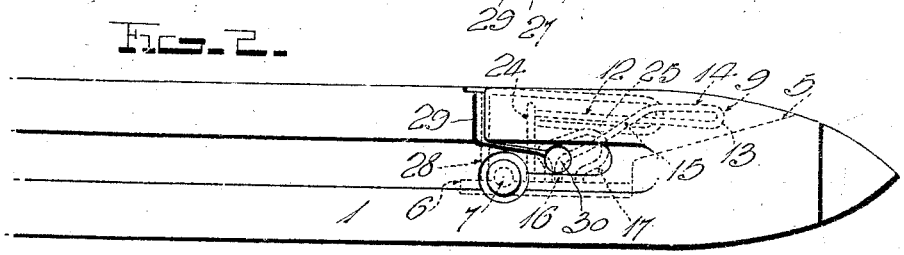
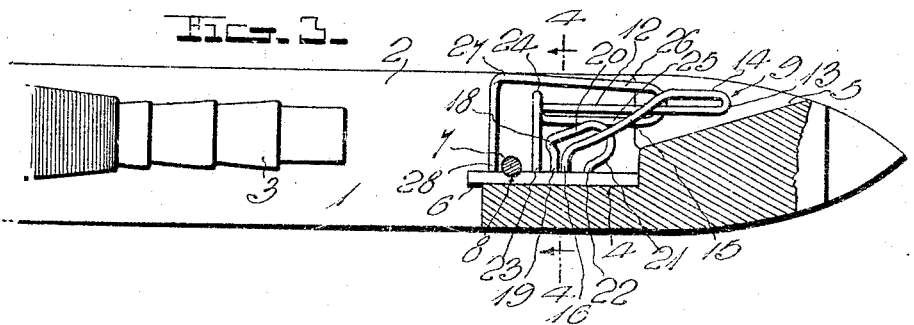
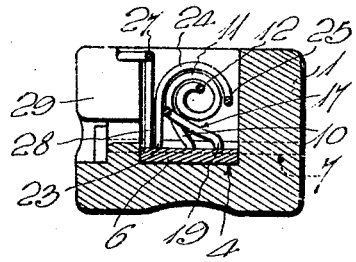
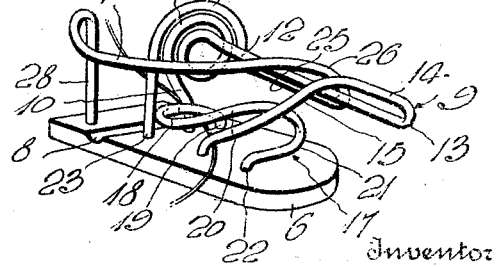
Inventor
Louis A. Cadoret

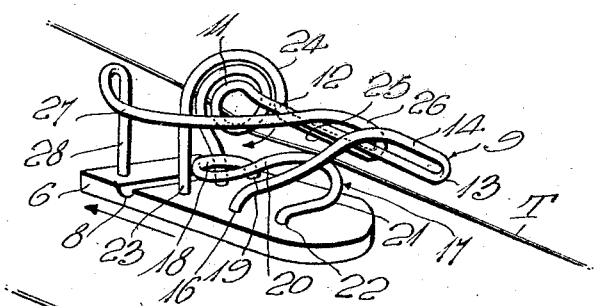
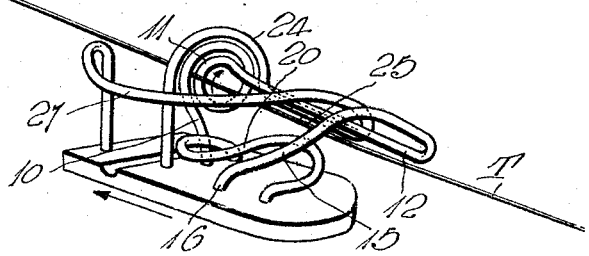
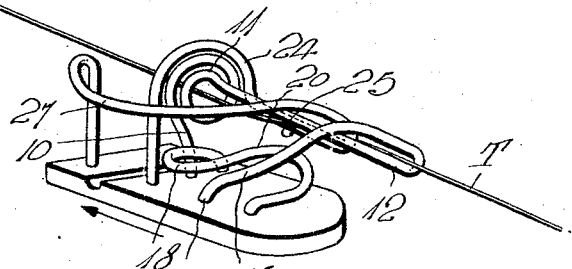
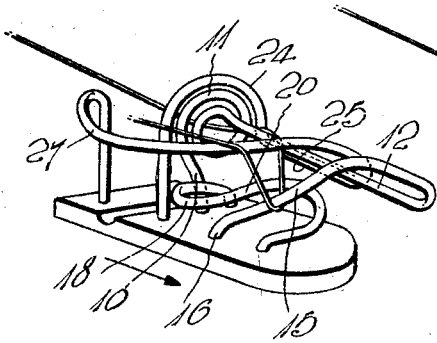
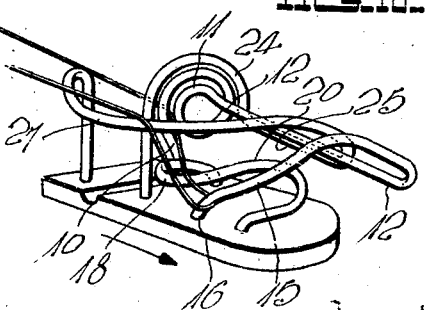

June 16, 1925.
L. A. CADORET
1,542,214
SHUTTLE THREADING DEVICE
Filed Oct. 30, 1924   3 Sheets-Sheet 3
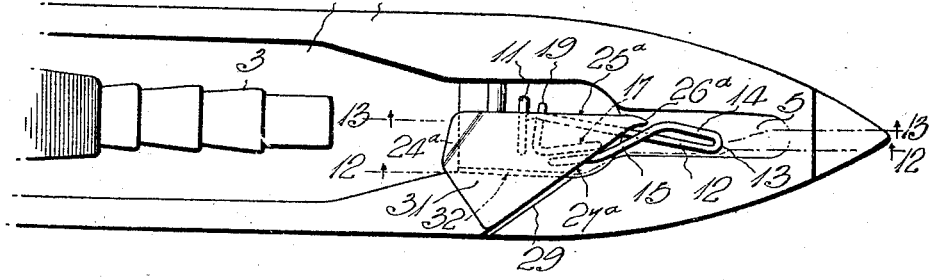
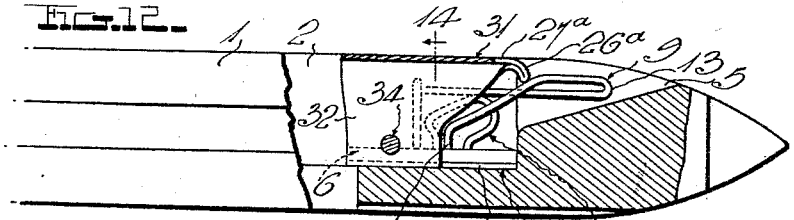
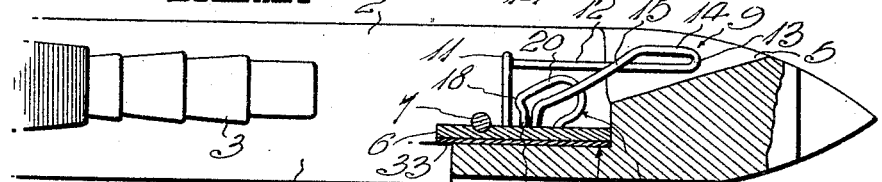
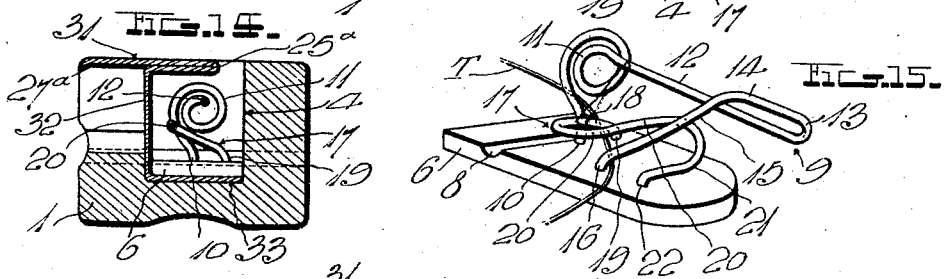
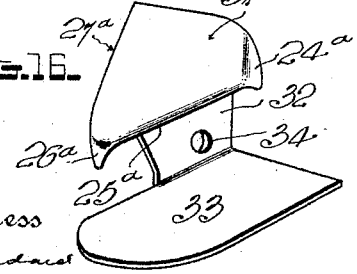
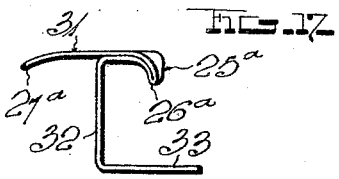
Inventor
Louis A. Cadoret Patented June 16, 1925.

1,542,214

UNITED STATES PATENT OFFICE.

LOUIS ALEXANDRE CADORET, OF PAWTUCKET, RHODE ISLAND.

SHUTTLE-THREADING DEVICE.

Application filed October 30, 1924. Serial No. 746,886.

*To all whom it may concern:*

Be it known that I, LOUIS A. CADORET, a citizen of the United States, residing at Pawtucket, in the county of Providence and State of Rhode Island, have invented certain new and useful Improvements in Shuttle-Threading Devices; and I do declare the following to be a full, clear, and exact description of the invention, such as will enable others skilled in the art to which it appertains to make and use the same.

My invention relates to improvements in devices for threading the shuttles of looms, and the invention is primarily designed for the automatic threading of shuttles, without requiring any manipulation of the thread by hand.

The construction herein disclosed is very similar to that shown in my pending U. S. application, Serial No. 704,835, filed April 7, 1924, the principal object being to provide an improved structure which may be more easily manufactured and mounted in the shuttle.

With the foregoing in view, the invention resides in the novel subject matter hereinafter described and claimed, the description being supplemented by the accompanying drawings.

Figure 1 is a top plan view showing one form of construction applied to a shuttle.

Figure 2 is a side elevation of the parts shown in Fig. 1.

Figure 3 is a longitudinal sectional view partly in elevation.

Figure 4 is a vertical transverse sectional view on line 4—4 of Fig. 3.

Figure 5 is a perspective view of the means for guiding the thread through the shuttle eye, the thread being shown in the position which it assumes when the shuttle is completely threaded.

Figures 6 to 10 are views similar to Fig. 5 but illustrating a number of the different positions taken by the thread as it is guided to the eye of the shuttle.

Figure 11 is a plan view showing a different form of construction.

Figures 12 and 13 are longitudinal sectional views cut in two different planes as indicated by lines 12—12 and 13—13 of Fig. 11.

Figure 14 is a vertical transverse sectional view on line 14—14 of Fig. 12.

Figure 15 is a perspective view of certain parts of the means for guiding the thread to the shuttle eye.

Figure 16 is a perspective view of another thread-guiding member which co-acts with the parts shown in Fig. 15.

Figure 17 is an end elevation of the member shown in Fig. 16.

In the drawings above briefly described, the numeral 1 designates a common form of shuttle having the usual longitudinal opening 2 for the thread-carrying bobbin 3. The shuttle is recessed as at 4, at one end of the opening 2, and a thread-guiding groove 5 is formed in the upper side of said shuttle from the recess 4 to the adjacent end of the shuttle, this groove being operative only while the shuttle is being threaded.

Secured in the lower portion of the recess 4, is an elongated base plate 6 which may well be held in place by a pin 7 passing transversely through the shuttle and seated in a transverse groove 8 in the upper side of the plate. Over the plate 6, is a thread-guiding member 9 which is formed of a single piece of wire. One end of this wire is secured to the plate 6 and extends in a substantially vertical direction therefrom to provide a thread-guiding leg 10, the wire at the upper end of this leg being coiled as at 11, to provide a scroll-like eye which is disposed in a vertical plane extending transversely of the plate 6. From the eye 11, the wire is extended to provide an arm 12 which is substantially horizontal and is preferably disposed at about right angles to the plane of said eye. At the end of this arm, remote from the eye 11, the wire is bent substantially upon itself as indicated at 13, the wire preferably extending horizontally over a portion of the arm 12, as indicated at 14 and then declining to provide a second relatively short arm 15. In addition to declining from the arm 12, the arm 15 diverges laterally from a vertical plane between itself and said arm 12, the lower extremity of said arm 15, being bent downwardly and secured to the base plate 6 providing a second thread-guiding leg 16 which is spaced from the first-named leg 10, on a line extending obliquely of the base plate.

A second length of wire 17 is disposed over the plate 6 and is bent into substantially V-shape in plan view, one arm 18 of the V being extended transversely beneath the arm 12 and having its free end turned downwardly at 19 and secured to the plate 6 in laterally spaced relation with the thread-guiding leg 10. The other arm 20 of the V-shaped piece of wire 17, extends along the lower portion of the declined arm 15 and is spaced both upwardly and inwardly therefrom, the free end of said arm 20 being curved downwardly at 21 and secured at 22 to the base plate 6, at a point which is spaced longitudinally of the base, from the leg 16. The bight portion or angle of the wire 17 is disposed between the legs 10 and 16 and extends across an oblique line intersecting these legs.

Another thread-guiding member is cooperable with the guides formed by the two pieces of wire, in the manner above described. In the form of construction shown in Figs. 1 to 5, the additional thread-guiding member is formed of a single length of wire having one of its ends disposed vertically and secured at 23 to the base plate 6, in laterally spaced relation with the leg 10. The wire is bent over the eye 11 as indicated at 24, then extends horizontally as at 25 in outwardly spaced relation with the arm 12, is then directed upwardly as at 26 behind the portion 14 of the arm 15, then extends obliquely as at 27 and finally curves inwardly and downwardly as at 28 and is secured to the plate 6. The portion 27 extends along the inner wall of the usual slot 29 in the shuttle, which slot leads to the shuttle eye 30, and the portion 26 of the wire, together with the wire portion 14 and the front end of the arm 12 are located in the groove 5.

Before explaining the construction of the different form of additional thread-guiding member shown in Figs. 11 to 14, and 16 and 17, the operation of the construction so far described, will be explained.

When the shuttle 1 makes its first trip to the left, along the lay, the end of the thread T is held in the usual manner, the thread first extending over the guiding means and through the groove 5 as shown in Fig. 1. As the thread whirls however, in unwinding from the bobbin 3, it is guided downwardly by the wire portions 24 and 25, and at one time will reach the position disclosed in Fig. 6, the thread being then under the eye 11. Then, further whirling of the thread, as the shuttle progresses to the left, causes the thread to move as indicated in Fig. 7, so that it finally is received in the eye 11, as shown in Fig. 8, the thread then passing under the arm 12 and then between this arm and the portion 14 of the arm 15, as shown in the figure last referred to. This position of the thread takes place when the shuttle has traveled only a very short distance from the left-hand end of the lay, and it will thus be seen that throughout the remainder of the shuttle travel, in this direction, the thread will be effectively guided. When the shuttle is forced on its next stroke toward the right, the thread rides under the arm 15, over the thread-guiding portion 27, and slides rearwardly along the arm 12, as will be clear from Fig. 9. Thus, the thread is removed from the eye 11 and placed in engagement with the guide legs 10 and 16, and at the same time, it is directed by the guide member 27 into the slot 29 and by the latter is guided into the eye 30. By comparing Fig. 10 with Fig. 5, it will be seen that as the thread slides down the arm 15 and the leg 10, it also slides along the arm 20 of the wire 17, eventually snapping under the connected ends of the arms 18 and 20, as seen in Fig. 5. The thread then passes around the guide legs 10 and 16 and extends obliquely between these legs, and the connected ends of the aforesaid arms 18 and 20, overlie the thread to hold it against upward movement, as the shuttle continues to operate.

The form of construction illustrated in Figs. 11 to 17, threads automatically in the same manner as the construction above described, but instead of using a bent wire member to guide the thread into the slot 29 of the shuttle, I employ a metal stamping. This stamping includes a substantially triangular top plate 31 which extends over the eye 11, is provided with an oblique edge $27^a$ extending along the inner wall of the slot 29, and is formed with a longitudinal edge $25^a$ extending longitudinally of the shuttle. The point $26^a$ between the edges $25^a$ and $27^a$ is preferably curved downwardly as shown, and disposed immediately behind the portion 14 of the inclined arm 15, and by preference, the corner of the plate at the inner end of the edge $25^a$ is curved downwardly as indicated at $24^a$.

The plate 31 is preferably carried by a vertical web 32 which rises from an auxiliary base plate 33, this base plate being secured against the bottom of the recess 4, by the base plate 6. The web 32 is formed with an opening 34 through which the retaining pin 7 passes. As will be clear from the drawings, the parts 31, 32, and 33 may well be formed from a single piece of metal bent into proper shape.

When the shuttle is operating toward the left, the plate 31 guides the thread downwardly into the groove and the thread then moves in the exact manner above described, so that the eye 11 is threaded as the shuttle moves to the left. Then, as the shuttle is driven to the right, while the thread slides downwardly under the arm 15, the edge $27^a$ of the plate 31, guides said thread into the shuttle slot 29.

Either form of construction may be threaded by hand if desired, simply by placing the thread in the groove 5 and pulling it under the connected ends of the arms 12 and 15.

Excellent results have been obtained from the details disclosed and they are therefore preferably followed, but within the scope of the invention as claimed, modifications may of course be made.

I claim:

1. A thread guide comprising a base plate intended to be secured in a shuttle recess, and a length of wire over said plate, the wire being secured at one end to the plate and extended upwardly to form a thread-guiding leg, said wire being extended from the upper end of said leg to provide a substantially horizontal arm, the wire being bent substantially upon itself at the end of said arm and then declining to provide a second arm which diverges laterally from a vertical plane between the two arms, the lower extremity of said second arm being bent downwardly and secured to the plate to provide a second thread-guiding leg.

2. A thread guide comprising a base plate intended to be secured in a shuttle recess, and a length of wire over said plate, the wire being secured at one end to the plate and extended upwardly to form a thread-guiding leg, said wire being coiled at the upper end of said leg to form a scroll-like guide eye disposed in a vertical plane, the wire being extended from the coil at substantially right angles to said plane to provide a substantially horizontal arm, said wire being bent substantially upon itself at the end of said arm and then declining to provide a second arm which diverges laterally from a vertical plane between the two arms, the lower extremity of said second arm being bent downwardly and secured to the plate to provide a second thread-guiding leg.

3. A thread guide comprising a base, a length of wire over said base bent into substantially V-shape, one arm of the V being substantially horizontal and having its free end bent, directed downwardly and secured to the base to provide a thread-guiding leg; the other arm of the V being relatively short, being declined from the first named arm, disposed in diverging relation with a vertical plane between the two arms, and having its free end bent downwardly and secured to the base to form a second thread-guiding leg spaced in a horizontal direction from the first named leg on an oblique line; and a second length of wire over the plate bent into substantially the form of a V in plan view, one arm of this V being extended transversely under the aforesaid horizontal arm and secured to the base in laterally spaced relation with the first named leg, the other arm of the last named V being extended along and spaced from the lower portion of the aforesaid second arm and having its free end bent downwardly and secured to the base at a point spaced longitudinally from the aforesaid second leg, the connected ends of the arms of said second named V extending across the above mentioned oblique line.

4. A thread guide comprising a base, a length of wire over said base secured at one end thereto and extended upwardly to form a thread-guiding leg, said wire being coiled at the upper end of said leg to form a scroll-like guide eye disposed in a vertical plane, the wire being extended from the coil at substantially right angles to said plane to provide a substantially horizontal arm, said wire being bent substantially upon itself at the end of said arm and then declining to provide a second arm which diverges laterally from a vertical plane between the two arms, the lower extremity of said second arm being bent downwardly and secured to the base to provide a second thread-guiding leg; and a thread-guiding member having a portion extending over the aforesaid eye, a portion extending substantially parallel with the above-named horizontal arm, and an oblique horizontal portion over said second arm, the latter being adapted to guide the thread into an eye-entrance-slot of a shuttle.

In testimony whereof I have hereunto affixed my signature.

LOUIS ALEXANDRE CADORET.